United States Patent
Khlat et al.

(10) Patent No.: US 8,180,384 B1
(45) Date of Patent: May 15, 2012

(54) TRANSMIT DATA TIMING CONTROL

(75) Inventors: Nadim Khlat, Midi-Pyrenees (FR); David Myara, Toulouse (FR)

(73) Assignee: RF Micro Devices, Inc., Greensboro, NC (US)

( * ) Notice: Subject to any disclaimer, the term of this patent is extended or adjusted under 35 U.S.C. 154(b) by 719 days.

(21) Appl. No.: 11/777,663

(22) Filed: Jul. 13, 2007

Related U.S. Application Data

(60) Provisional application No. 60/807,300, filed on Jul. 13, 2006, provisional application No. 60/821,464, filed on Aug. 4, 2006.

(51) Int. Cl.
*H04J 3/06* (2006.01)

(52) U.S. Cl. ........ 455/502; 455/265; 370/350; 370/503; 370/509; 370/520

(58) Field of Classification Search ............ 455/73, 455/115.4, 405; 370/328
See application file for complete search history.

(56) References Cited

U.S. PATENT DOCUMENTS

| | | | | |
|---|---|---|---|---|
| 4,176,318 A * | 11/1979 | Johnson et al. | ............ | 455/115.4 |
| 5,546,382 A * | 8/1996 | Fujino | ............ | 455/405 |
| 5,852,609 A * | 12/1998 | Adams et al. | ............ | 370/465 |
| 6,128,318 A * | 10/2000 | Sato | ............ | 370/503 |
| 7,055,050 B2 * | 5/2006 | Domon | ............ | 713/400 |
| 2002/0178292 A1 * | 11/2002 | Mushkin et al. | ............ | 709/248 |
| 2004/0109422 A1 * | 6/2004 | Naito | ............ | 370/328 |
| 2005/0202818 A1 * | 9/2005 | Hondo et al. | ............ | 455/434 |

FOREIGN PATENT DOCUMENTS

JP 2002009684 A * 1/2002

* cited by examiner

*Primary Examiner* — Temesgh Ghebretinsae
*Assistant Examiner* — Gennadiy Tsvey
(74) *Attorney, Agent, or Firm* — Withrow & Terranova, P.L.L.C.

(57) ABSTRACT

An RF transmitter that, during a transmission session, transmits multiple data slices, which are synchronized to each other by a transmit counter. Typically, the time between transmission of consecutive data slices is constant; however, to synchronize the transmission session with a base station, the time between transmission of consecutive data slices may be occasionally adjusted. By using the transmit counter to synchronize data transmissions, effects of uncompensated latencies or variances in latencies may be reduced or eliminated.

25 Claims, 8 Drawing Sheets

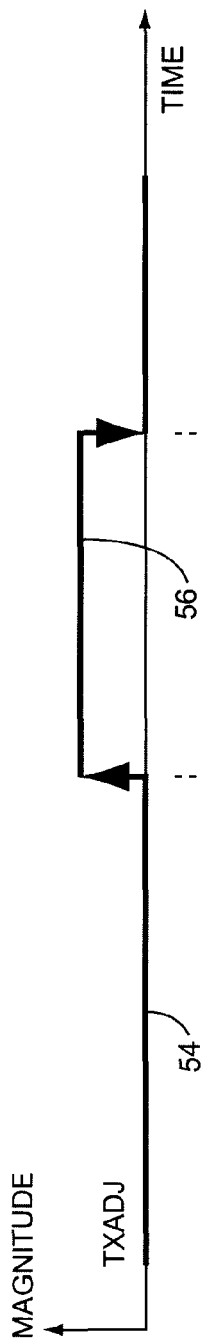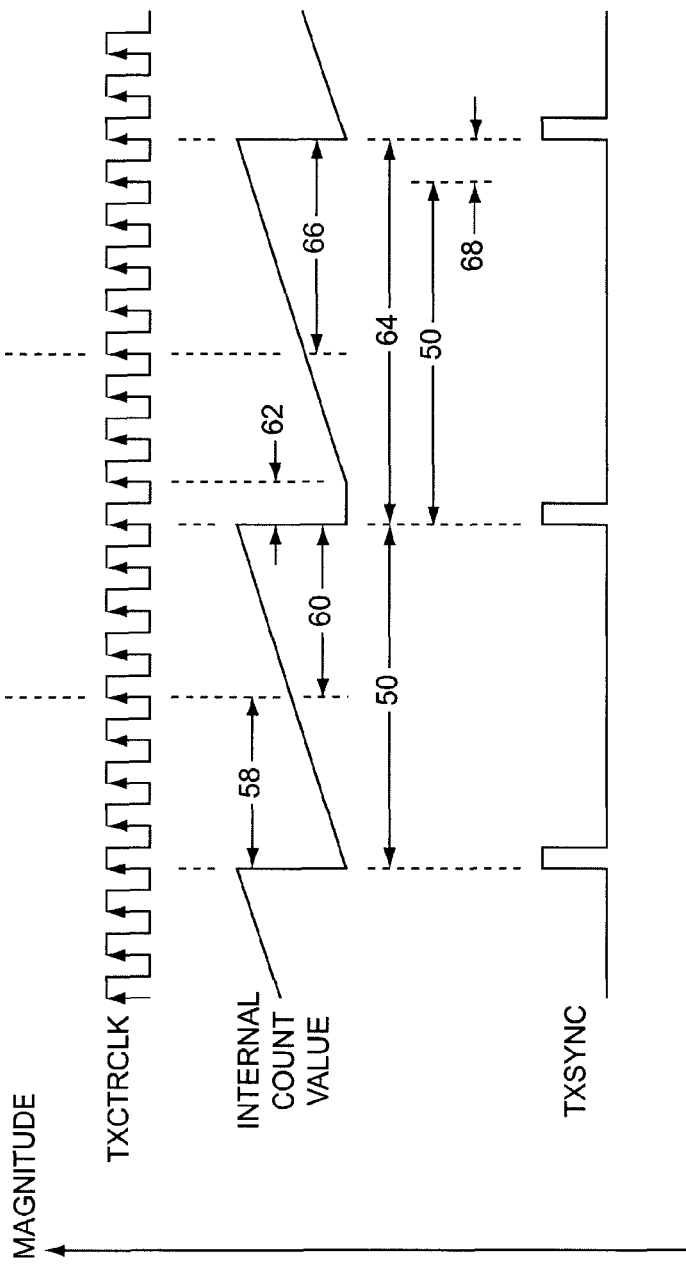
FIG. 5A
FIG. 5B

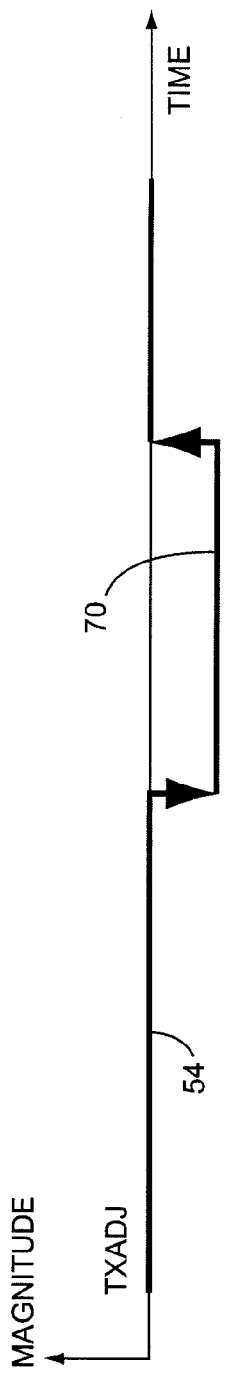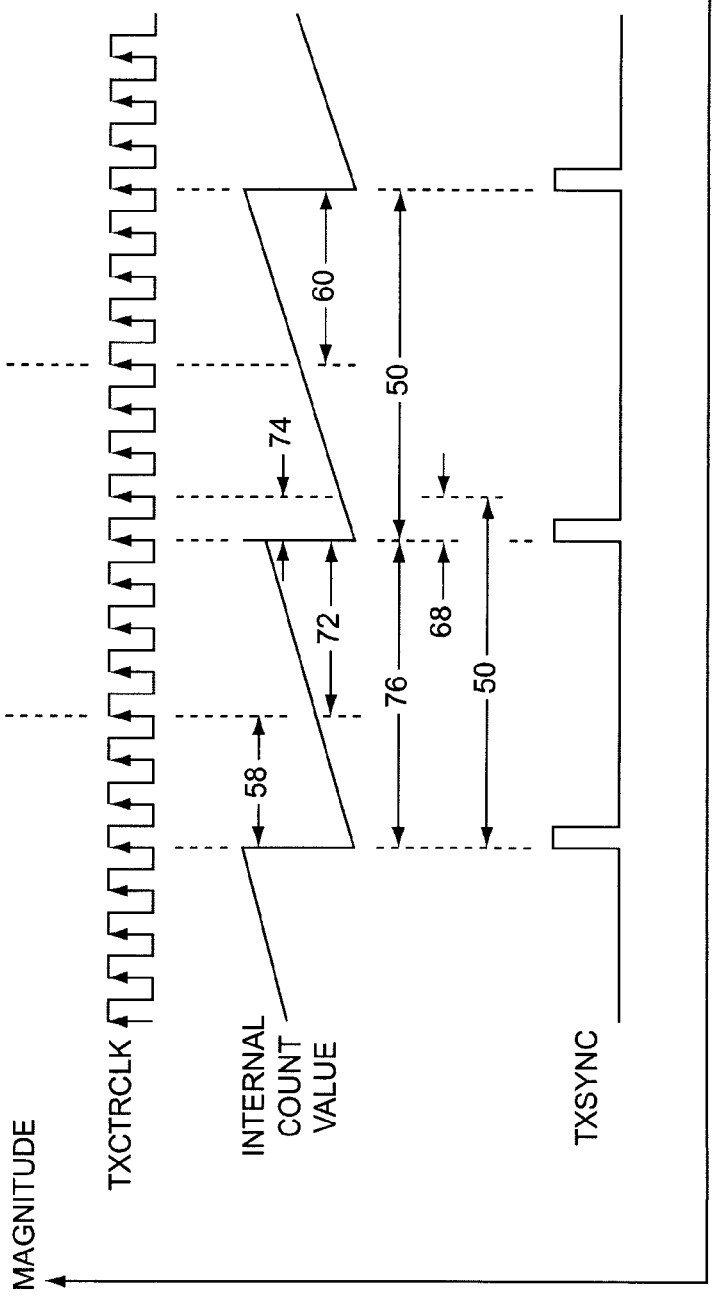
FIG. 6A
FIG. 6B

TRANSMIT DATA TIMING CONTROL

This application claims the benefit of provisional patent application Ser. No. 60/807,300, filed Jul. 13, 2006, and provisional patent application Ser. No. 60/821,464, filed Aug. 4, 2006, the disclosures of which are hereby incorporated by reference in their entireties.

FIELD OF THE INVENTION

The present invention relates to radio frequency (RF) transmitters, which may be used in RF communications systems.

BACKGROUND OF THE INVENTION

With advances in technology, wireless communications protocols have become more sophisticated and demanding. Specifically, timing requirements related to communications between two wireless devices may be increasingly restrictive. For example, third generation and later cellular communications protocols may have tight restrictions regarding synchronization between a base station and a mobile terminal, such as a cell phone, a personal digital assistant (PDA), or the like.

In a continuous transmit system, such as a Wideband Code Division Multiple Access (WBCDMA) system, a mobile terminal may begin a continuous transmission in response to a command from a base station. The start of the continuous transmission may be timed, with tight timing requirements, from the receipt of the command. Due to latencies in the mobile terminal, there may be an error in the start of the continuous transmission. However, during the continuous transmission, the base station may send additional commands, which may adjust the timing of specific data in the continuous transmission. The specific data may be advanced or delayed to correct for any timing error in the start of the continuous transmission or to correct for subsequent timing errors; however, if the commands that adjust the timing of specific data introduce their own latency errors, then timing requirements may be difficult to meet. Additionally, the continuous transmission may be interrupted for a brief period to accommodate receive for monitoring purposes. It may be required for the continuous transmission to resume synchronously with the portion of the continuous transmission from before the interruption. Interrupting and resuming a continuous transmission is called a compressed mode.

A mobile terminal may include a baseband integrated circuit (IC) and an RF IC that communicate with each other using a baseband communications link. Receipt of a timing-related command may be received and down-converted by the RF IC, sent to the baseband IC over the baseband communications link, and processed by the baseband IC to create a transmit timing command, which is sent to the RF IC over the baseband communications link. The RF IC decodes and executes the transmit timing command to begin, adjust, or resume continuous transmission. However, uncompensated latencies or variances in latencies introduced by the baseband IC, the RF IC, or the baseband communications link may introduce transmit timing errors that cannot be corrected. Thus, there is a need to reduce the effects of uncompensated latencies or variances in latencies on the timing of data in a continuous transmission.

SUMMARY OF THE INVENTION

The present invention is an RF transmitter that, during a transmission session, transmits multiple data slices, which are synchronized to each other by a transmit counter. Typically, the time between transmission of consecutive data slices is constant; however, to synchronize the transmission session with a base station, the time between transmission of consecutive data slices may be occasionally adjusted. By using the transmit counter to synchronize data transmissions, effects of uncompensated latencies or variances in latencies may be reduced or eliminated.

In one embodiment of the present invention, an RF receiver is used such that the transmission session may be initiated upon receiving a transmit control message from the base station. Additionally, the base station may occasionally send timing adjustment information by sending additional transmit control messages. The timing adjustment information is used to adjust the transmit counter to provide desired timing of data slice transmissions. When operating in a compressed mode during a transmission session, transmission of data slices may be interrupted for a brief period so receive monitoring can be performed; however, during the interruption, the transmit counter continues to run so that resumption of data slice transmission is still synchronized.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 5A and 5B are graphs showing timing relationships of transmit counter circuitry signals illustrated in FIG. 1 during a timing delay adjustment.

FIGS. 6A and 6B are graphs showing timing relationships of transmit counter circuitry signals illustrated in FIG. 1 during a timing advance adjustment.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention is an RF transmitter that, during a transmission session, transmits multiple data slices, which are synchronized to each other by a transmit counter. Typically, the time between transmission of consecutive data slices is constant; however, to synchronize the transmission session with a base station, the time between transmission of consecutive data slices may be occasionally adjusted. By using the transmit counter to synchronize data transmissions, effects of uncompensated latencies or variances in latencies may be reduced or eliminated.

In one embodiment of the present invention, an RF receiver is used such that the transmission session may be initiated upon receiving a transmit control message from the base station. Additionally, the base station may occasionally send timing adjustment information by sending additional transmit control messages. The timing adjustment information is used to adjust the transmit counter to provide desired timing of data slice transmissions. When operating in a compressed mode during a transmission session, transmission of data slices may be interrupted for a brief period so receive monitoring can be performed; however, during the interruption, the transmit counter continues to run so that resumption of data slice transmission is still synchronized.

Figure 1:
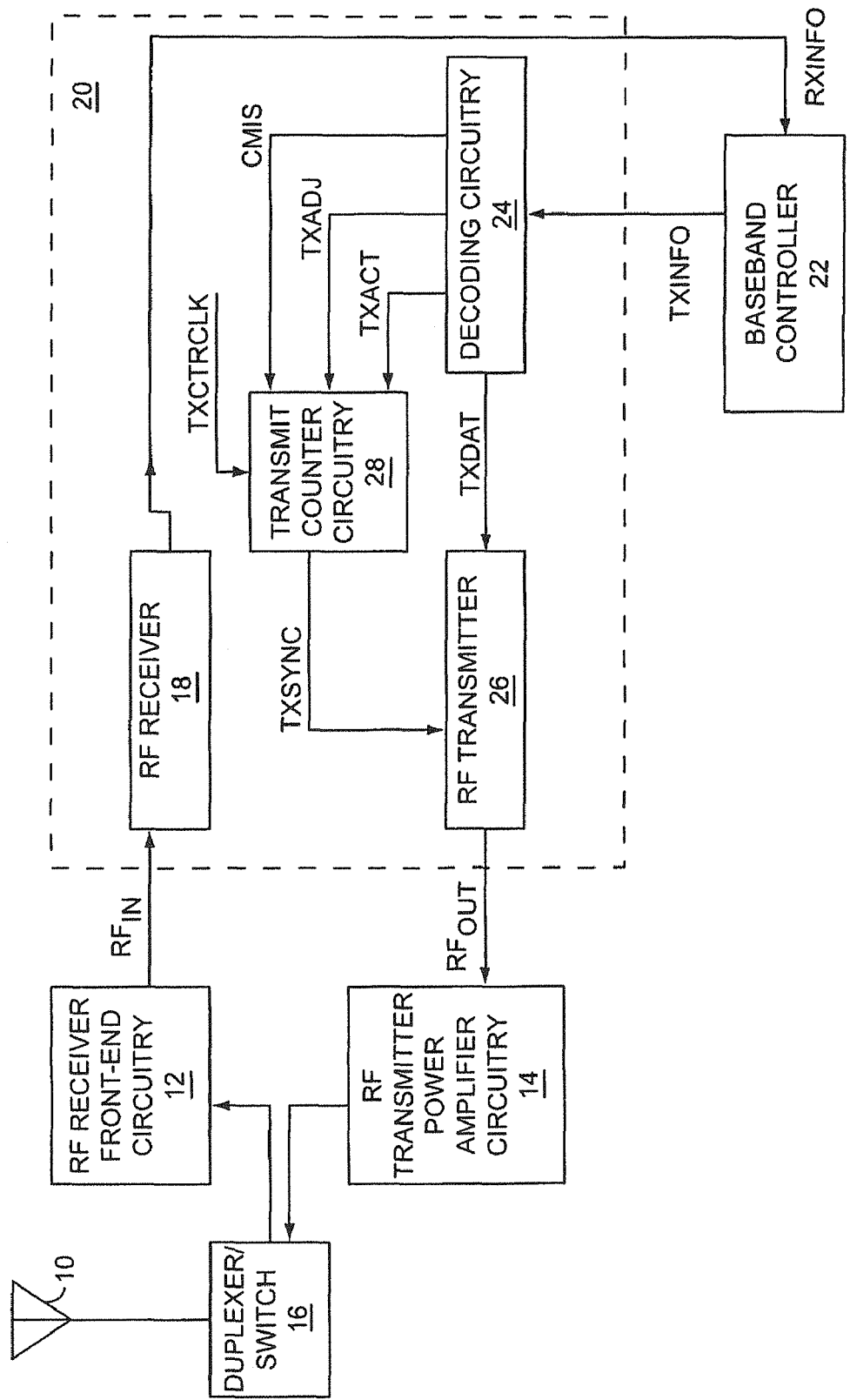
FIG. 1 illustrates one embodiment of the present invention used with RF communications circuitry.

FIG. 1 illustrates one embodiment of the present invention used with RF communications circuitry. An antenna 10 is coupled to RF receiver front-end circuitry 12 and RF transmitter power amplifier circuitry 14 through a duplexer or switch 16. The RF receiver front-end circuitry 12 receives signals from the antenna 10 and provides an RF input signal $RF_{IN}$ to an RF receiver 18, which is part of an RF transceiver 20. The RF receiver 18 down converts the RF input signal $RF_{IN}$ and provides baseband receive information RXINFO to a baseband controller 22. The baseband controller 22 provides baseband transmit information TXINFO to decoding circuitry 24, which is part of the RF transceiver 20. The baseband transmit and baseband receive information TXINFO, RXINFO may be provided over a baseband communications link between the RF transceiver 20 and the baseband controller 22. The decoding circuitry 24 extracts baseband transmit data TXDAT from the baseband transmit information TXINFO, and then provides the baseband transmit data TXDAT to an RF transmitter 26. Transmit counter control information is also extracted from the baseband transmit information TXINFO by the decoding circuitry 24, which uses the transmit counter control information to generate a transmit activation signal TXACT, a transmit adjustment signal TXADJ, and a compressed mode interrupt signal CMIS, which are provided to transmit counter circuitry 28.

The transmit counter circuitry 28 receives a transmit counter clock signal TXCTRCLK, which is used to increment a transmit counter. The transmit counter circuitry 28 uses the transmit activation signal TXACT, the transmit adjustment signal TXADJ, the compressed mode interrupt signal CMIS, and the transmit counter clock signal TXCTRCLK to provide a transmit synchronization signal TXSYNC to the RF transmitter 26. The RF transmitter 26 uses the baseband transmit data TXDAT to generate data slices, which are synchronized to each other by the transmit synchronization signal TXSYNC. The RF transmitter uses the data slices to generate an RF output signal $RF_{OUT}$, which feeds the RF transmitter power amplifier circuitry 14. The RF transmitter power amplifier circuitry 14 amplifies the RF output signal $RF_{OUT}$ to provide an amplified RF output signal to the antenna 10 through the duplexer or switch 16 for transmission. The RF receiver 18 may receive transmit control commands from a base station, and then forward the transmit control commands to the decoding circuitry 24 through the baseband controller 22. The transmit control commands may be used to start a transmission session that is synchronized with the base station, adjust the timing of transmitted data, interrupt or resume data transmission while operating in a compressed mode, or any combination thereof. The transmit activation signal TXACT, the transmit adjustment signal TXADJ, the compressed mode interrupt signal CMIS, or any combination thereof, may be based on the transmit control commands.

Figure 2:
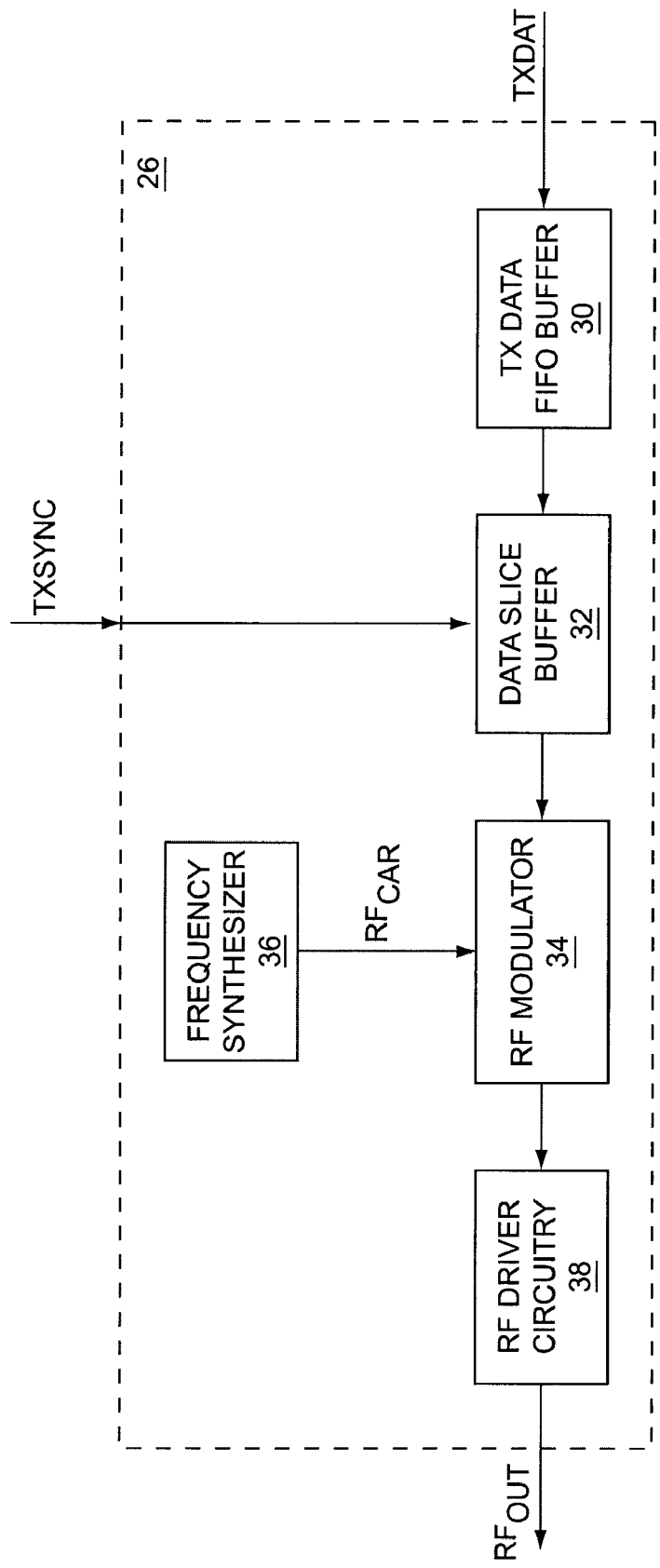
FIG. 2 shows details of the RF transmitter illustrated in FIG. 1.

FIG. 2 shows details of the RF transmitter 26 illustrated in FIG. 1. The baseband transmit data TXDAT feeds a transmit data first-in first-out (FIFO) buffer 30, which feeds a data slice buffer 32. The transmit data FIFO buffer 30 forwards the baseband transmit data TXDAT in the order in which it is received. The data slice buffer 32 divides the forwarded baseband transmit data TXDAT into data slices, such that each slice is forwarded when gated by the transmit synchronization signal TXSYNC. By gating the data slices with the transmit synchronization signal TXSYNC, precise timing of transmitted data can be maintained. The data slice buffer 32 feeds the gated data slices to an RF modulator 34, which uses the data slices to modulate an RF carrier signal $RF_{CAR}$ that is provided by a frequency synthesizer 36. The RF modulator 34 feeds the modulated RF carrier signal to RF driver circuitry 38, which amplifies the modulated RF carrier signal to provide the RF output signal $RF_{OUT}$.

Figure 3:
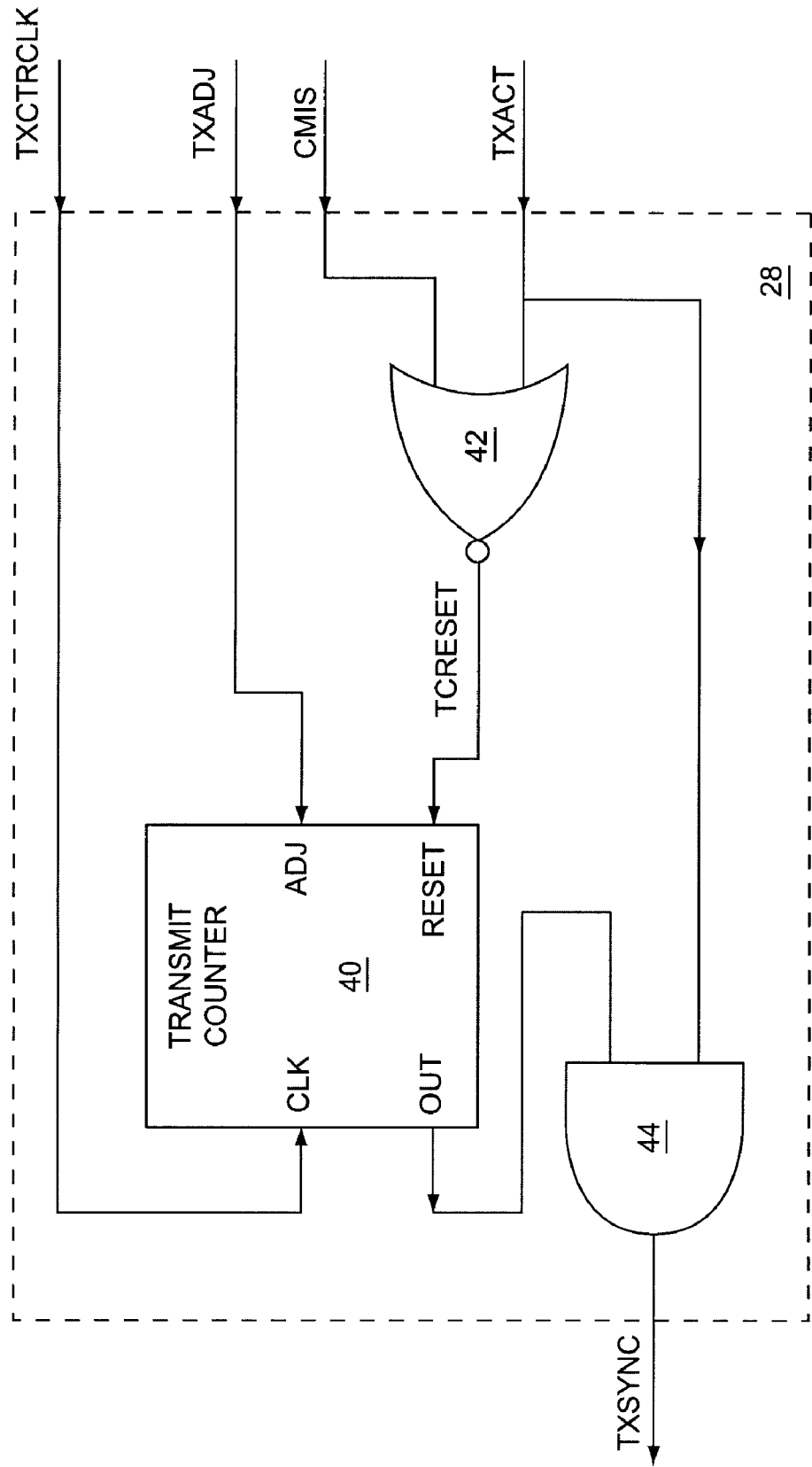
FIG. 3 shows details of the transmit counter circuitry illustrated in FIG. 1.

FIG. 3 shows details of the transmit counter circuitry 28 illustrated in FIG. 1. The transmit counter clock signal TXCTRCLK feeds a clock input CLK of a transmit counter 40. The transmit activation signal TXACT and the compressed mode interrupt signal CMIS feed a NOR gate 42, which provides a transmit counter reset signal TCRSET to a reset input RESET to the transmit counter 40. The transmit adjustment signal TXADJ feeds an adjustment input ADJ to the transmit counter 40. The transmit counter 40 provides an output signal from an output OUT to an AND gate 44. The transmit activation signal TXACT feeds the AND gate 44, which provides the transmit synchronization signal TXSYNC. When the transmit counter reset signal TCRESET is held in a HIGH state, the transmit counter 40 is held in reset, which forces and holds an internal counter value to zero. When the transmit counter reset signal TCRESET is held in a LOW state, the transmit counter 40 is removed from reset and allowed to count. The compressed mode interrupt signal CMIS has an interrupted state, which corresponds to a HIGH state, and a non-interrupted state, which corresponds to a LOW state. The transmit activation signal TXACT has an enable state, which corresponds to a HIGH state, and a disable state, which corresponds to a LOW state.

Following the logic of the NOR gate 42, when the compressed mode interrupt signal CMIS is in the non-interrupted state, and when the transmit activation signal TXACT is in the disable state, the transmit counter reset signal TCRESET is in the HIGH state, which holds the transmit counter 40 in reset. When either the compressed mode interrupt signal CMIS is in the interrupt state or the transmit activation signal TXACT is in the enable state, the transmit counter reset signal TCRESET is in the LOW state, which removes the transmit counter 40 from reset. When removed from reset, the transmit counter 40 increments with each cycle of the transmit counter clock signal TXCTRCLK until the transmit counter 40 reaches a maximum value, which produces an indication on the output signal from the output OUT. The output signal flows through the AND gate 44 to produce the transmit synchronization signal TXSYNC as long as the transmit activation signal TXACT is in the enable state. If the transmit activation signal TXACT is in the disabled state, which is a LOW state, the transmit synchronization signal TXSYNC is held in a LOW state. Alternate embodiments of the present invention may use different transmit counter architectures to synchronize transmission of data slices with each other using a transmit synchronization signal TXSYNC, using a transmit activation signal TXACT, and a transmit adjustment signal TXADJ.

Figure 4:
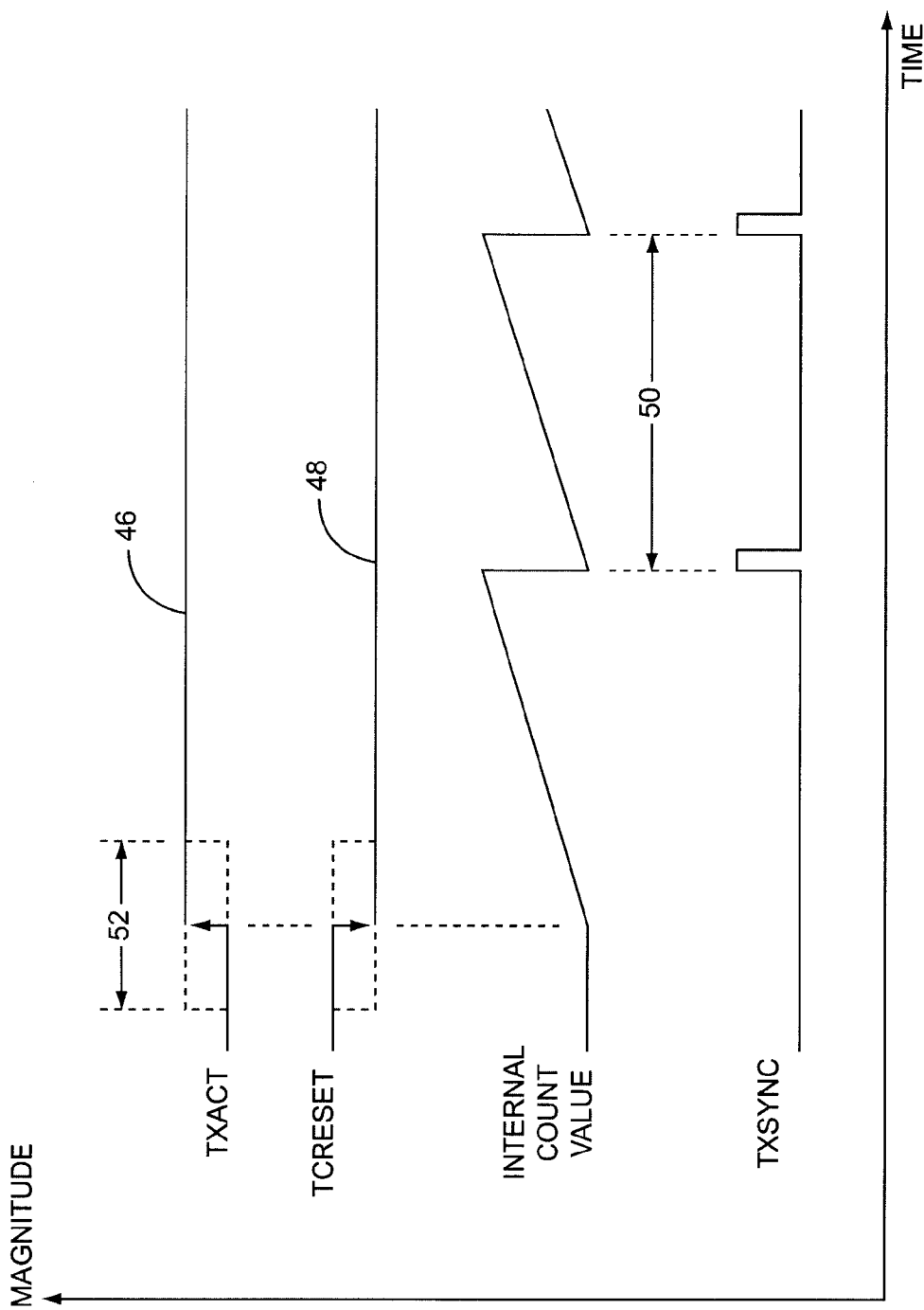
FIG. 4 is a graph showing timing relationships of transmit counter circuitry signals illustrated in FIG. 1.

FIG. 4 is a graph showing timing relationships of the signals associated with the transmit counter circuitry 28 illustrated in FIG. 1. At the start of a transmission session, the transmit activation signal TXACT transitions to an enabled state 46, which causes the transmit counter reset signal TCRESET to transition to a non-reset state 48. The non-reset state 48 allows the transmit counter 40 to begin incrementing. The transmit counter 40 increments such that its internal count value increases until a maximum count value is reached, which causes the internal count value to drop to zero. When the internal count value drops to zero, a pulse is provided from the output OUT, which provides a pulse in the transmit synchronization signal TXSYNC. When the internal count value transitions to zero, incrementing of the transmit counter 40 proceeds until the maximum count value is obtained, which causes the internal count value to transition to zero again. The time between consecutive transitions of the internal count value to zero is a nominal count period 50. Typically, the nominal count period 50 will be equal to the time required to transmit a single data slice, and the data slice period will be an integer sub-multiple of any compressed period time. By gating transmission of each data slice with the transmit synchronization signal TXSYNC, a continuous stream of transmitted data is maintained and synchronized. The transmit synchronization signal TXSYNC does not start generating pulses until the internal count value reaches its maximum count value for the first time; therefore, transmission of the first data slice will not begin until one nominal count period 50 after transition of the transmit activation signal TXACT to the enabled state 46. If transmission of data slices is in response to a transmit control command, then the delay between the transition of the transmit activation signal TXACT to the enabled state and the beginning of transmission of the data slices must be accounted for when generating the transmit activation signal TXACT. Additionally, processing latencies in receiving and forwarding the transmit control command must also be accounted for when generating the transmit activation signal TXACT. Unaccounted for latencies, latency variations, or both, may contribute to a start transmission error 52 when generating the transmit activation signal TXACT. The start transmission error 52 results in a synchronization error between the transmitted signal and the base station. In one embodiment of the present invention, the nominal count period 50 is larger than the start transmission error 52. To correct for the start transmission error 52, other timing errors, or both, the transmit counter 40 includes a mechanism to make timing adjustments, which may be in the form of transmit control commands from the base station.

FIGS. 5A and 5B are graphs showing timing relationships of signals associated with the transmit counter circuitry 28 illustrated in FIG. 1 during a timing delay adjustment. The transmit adjustment signal TXADJ may have a nominal value 54 and a delay value 56. When the transmit adjustment signal TXADJ has the nominal value 54, the transmit synchronization signal TXSYNC is a pulse train having the nominal count period 50. When the base station sends a transmit control command to delay transmission of the data slices, the transmit adjustment signal TXADJ may have the delay value 56 for a single cycle of the transmit synchronization signal TXSYNC. Timing adjustments to the transmit counter 40 are performed near the transition of the internal count value from its maximum count value to zero; therefore, transitions of the transmit adjustment signal TXADJ are typically made during the middle of a count cycle.

The time from the transition of the internal count value from its maximum count value to zero to a transition of the transmit adjustment signal TXADJ during nominal operating conditions is a nominal TXADJ delay 58. The time from a transition of the transmit adjustment signal TXADJ to a transition of the internal count value from its maximum count value to zero during nominal operating conditions is a nominal TXADJ set-up 60. When the internal count value transitions from its maximum count value to zero following a transition from the nominal value 54 to the delay value 56, the transmit counter 40 is held in reset for a single clock cycle called a freeze duration 62, which lengthens the count period by one clock cycle, thereby creating a delay count period 64. The time from the transition of the delay value 56 to the nominal value 54 to the transition from the internal count value from its maximum count value to zero is a delay TXADJ set-up 66. The delay count period 64 is one clock period 68 of the transmit counter clock signal TXCTRCLK longer than the nominal count period 50, which provides a delay adjustment of the transmit synchronization signal TXSYNC.

FIGS. 6A and 6B are graphs showing timing relationships of signals associated with the transmit counter circuitry 28 illustrated in FIG. 1 during a timing advance adjustment. If a transmit control command is received from the base station that advances the transmission of the data slices, the transmit adjustment signal TXADJ may transition from its nominal value 54 to an advance value 70. The delay from the transition of the nominal value 54 to the advance value 70 to the transition of the internal count value from its maximum count value to zero is called an advance TXADJ set-up 72. When the transmit counter 40 receives the advance value 70, the transmit counter 40 double increments the last count to the maximum count value, which causes an advance transition 74 of the internal count value from its maximum count value to zero. This advancing mechanism generates an advance count period 76 in the transmit synchronization signal TXSYNC, which is one clock period 68 of the transmit counter clock signal TXCTRCLK less than the nominal count period 50. This advance in the transmit synchronization signal TXSYNC causes a timing advance in transmission of the data slices.

If the base station sends a transmit control command requiring timing adjustments of greater than one clock period 68 of the transmit counter clock signal TXCTRCLK, the delay value 56 or advance value 70 could be maintained for multiple count periods. In an alternate embodiment of the present invention, the delay count period 64 or the advance count period 76 may differ from the nominal count period 50 by two or more clock periods of the transmit counter clock signal TXCTRCLK.

Figure 7:
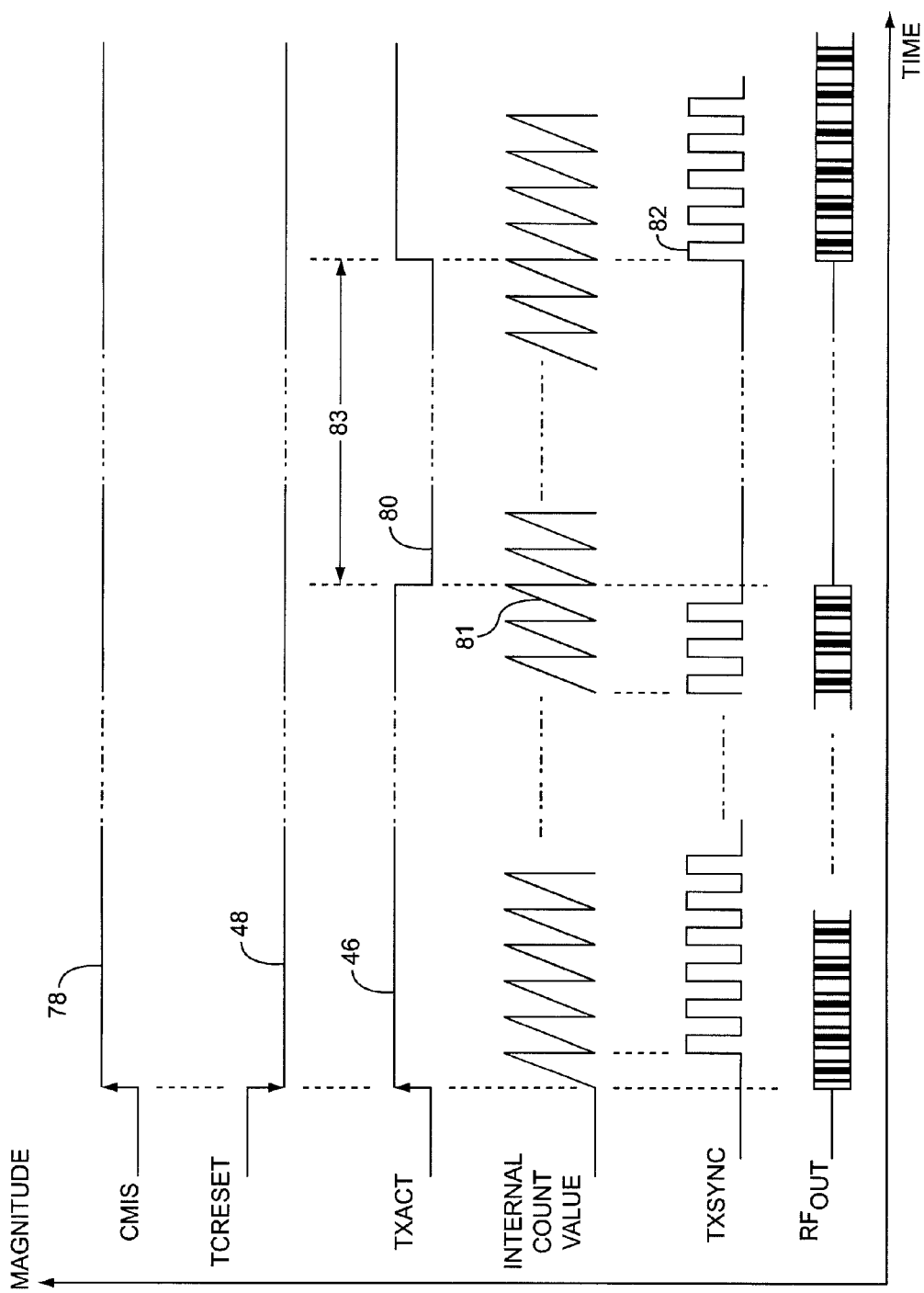
FIG. 7 is a graph showing timing relationships of transmit counter circuitry signals illustrated in FIG. 1 during a compressed mode of operation.

FIG. 7 is a graph showing timing relationships of signals associated with the transmit counter circuitry 28 illustrated in FIG. 1 during a compressed mode of operation. At the start of a transmission session that supports the compressed mode of operation, the transmit activation signal TXACT may transition to the enabled state 46, and the compressed mode interrupt signal CMIS may transition to an interrupted state 78, which causes the transmit counter reset signal TCRESET to transition to the non-reset state 48. The transmit counter 40 performs normally by generating the transmit synchronization signal TXSYNC having the nominal count period 50. The RF output signal $RF_{OUT}$ is based on transmission of the data slices. At a point in the transmission session, which may be in response to a transmit control command, the transmit activation signal TXACT transitions to a disabled state 80, which masks the transmit synchronization signal TXSYNC and disables the RF transmitter 26 after the last corresponding data slice transmission 81; however, the transmit counter 40 continues to function as before. When the transmit activation signal TXACT transitions from the disabled state 80 to the enabled state 46, which may be in response to a transmit control command received from the base station, the transmit synchronization signal TXSYNC is unmasked and the RF output signal $RF_{OUT}$ is restored upon the first TXSYNC transition 82. The duration of interrupted transmissions is called an interruption period 83. The restored transmissions are synchronized to the interruption in transmission when the transmit activation signal TXACT transitions from the enabled state 46 to the disabled state 80. As long as unaccounted for latencies, latency variations, or both, in response to transmit control commands from the base station do not exceed TXADJ delay or set-up times 58, 60, 66, 72, timing of transmissions from the RF transmitter 26 will be maintained by the transmit counter 40.

A chip is a pair of word bits that represent a complex sample unit of the modulation that may be used to represent information in a transmitted signal; therefore, it may be useful in some applications to represent data slices in terms of chips. In an exemplary embodiment of the present invention, one data slice includes eight chips; therefore, the duration of eight chips is equal to the nominal count period 50. The nominal count value is equal to sixty-five, such that the nominal count period 50 is sixty-five times one clock period 68 of the transmit counter clock signal TXCTRCLK; therefore, one clock period 68 is less than the duration of one-eighth of a chip. Since either the advance value 70 or the delay value 56 cause advances or delays of one clock period 68, each advance or delay is by less than one-eighth of a chip. If a transmit control command is received from the base station that requires larger timing adjustments, such as an advance or delay of one-quarter of a chip, an advance or delay value 70, 56 may be applied for multiple count periods. A communications system with a timing accuracy requirement of plus or minus one-quarter of a chip can be easily maintained by making periodic adjustments of one clock period 68. If the start transmission error 52 is within plus or minus 1.5 chips, the transmit counter 40 can accommodate necessary transmit control commands from the base station to correct the timing error since the duration of a data slice is eight chips. A slot may be equal to 2,560 chips, and in a compressed mode of operation, transmission may be interrupted for at least three slots. If the transmit counter clock signal TXCTRCLK is accurate within ten parts per million and the timing inaccuracy before the transmission interruption was within plus or minus one-eighth of a chip, then the timing inaccuracy when transmissions resume will be within plus or minus one-quarter of a chip. One clock period 68 of the transmit counter clock signal TXCTRCLK may be approximately equal to 32.1 nanoseconds.

Figure 8:
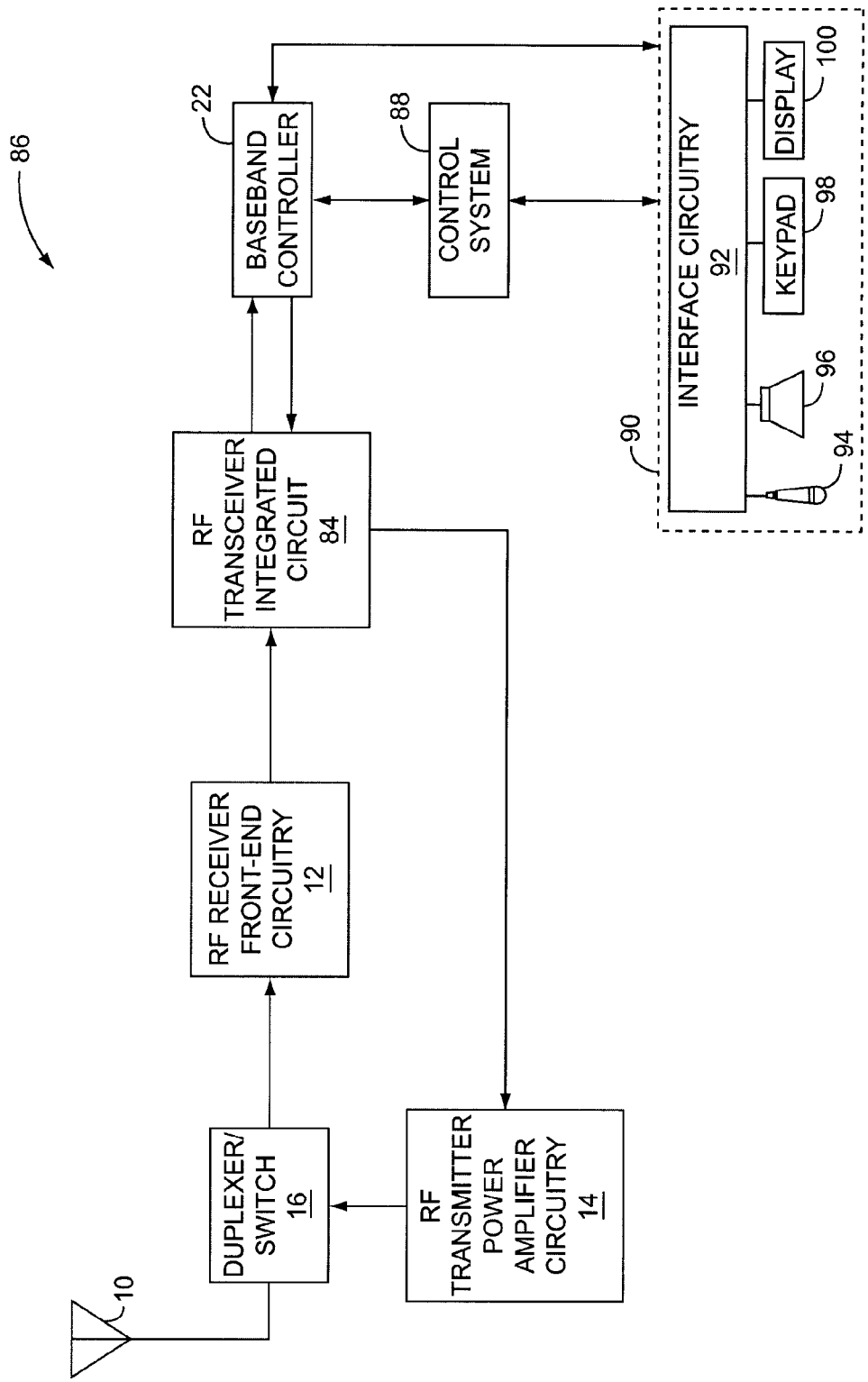
FIG. 8 shows an application example of the present invention used in a mobile terminal.

An application example of a transmit counter is its use in an RF transceiver integrated circuit 84 in a mobile terminal 86, the basic architecture of which is represented in FIG. 8. The mobile terminal 86 may include the RF receiver front-end circuitry 12, the RF transmitter power amplifier circuitry 14, the RF transceiver integrated circuit 84, the antenna 10, the duplexer or switch 16, the baseband controller 22, a control system 88, and an interface 90. The RF receiver front-end circuitry 12 receives information bearing radio frequency signals from one or more remote transmitters provided by a base station (not shown), and feeds the received signals to the RF transceiver integrated circuit 84, which provides down-converted signals to the baseband controller 22.

On the transmit side, the baseband controller 22 receives digitized data, which may represent voice, data, or control information, from the control system 88, which it encodes for transmission. The encoded data is output to the RF transceiver integrated circuit 84, where it is used to modulate a carrier signal that is at a desired transmit frequency. The RF transceiver integrated circuit 84 and the RF transmitter power amplifier circuitry 14 amplify the modulated carrier signal to a level appropriate for transmission, and delivers the amplified and modulated carrier signal to the antenna 10 through the duplexer or switch 16.

A user may interact with the mobile terminal 86 via the interface 90, which may include interface circuitry 92 associated with a microphone 94, a speaker 96, a keypad 98, and a display 100. The interface circuitry 90 typically includes analog-to-digital converters, digital-to-analog converters, amplifiers, and the like. Additionally, it may include a voice encoder/decoder, in which case it may communicate directly with the baseband controller 22. The microphone 94 will typically convert audio input, such as the user's voice, into an electrical signal, which is then digitized and passed directly or indirectly to the baseband controller 22. Audio information encoded in the received signal is recovered by the baseband controller 22 and converted by the interface circuitry 92 into an analog signal suitable for driving the speaker 96. The keypad 98 and display 100 enable the user to interact with the mobile terminal 86, input numbers to be dialed, address book information, or the like, as well as monitor call progress information.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   receiving a transmit control command from a base station, wherein the transmit control command includes one of an advance transmission instruction and a delay transmission instruction;
   receiving, at a logical NOR gate, a compression mode interrupt signal and a transmit activation signal;
   outputting, from the logical NOR gate, a reset signal;
   incrementing a transmit counter based on a count of the transmit counter and the transmit control command, wherein the transmit counter is reset a clock cycle early in response to receipt of the advance transmission instruction, wherein the transmit counter is held in reset for a clock cycle in response to receipt of the delay transmission instruction, and wherein a pulse is provided from a transmit counter output upon resetting;
   generating a transmit synchronization signal based on outputted pulses from the transmit counter logically anded with a transmit activation signal, wherein the transmit synchronization signal includes a transmit time period;
   slicing baseband transmit data into a plurality of data slices for transmission;
   gating each of the plurality of data slices provided to an RF modulator for transmission based on the transmit synchronization signal, wherein one of the plurality of data slices is provided to the RF modulator per the transmit time period; and generating an RF transmit signal with the RF modulator based on each of the plurality of data slices, such that transmission of each of the data slices is synchronized to the base station.

2. Radio frequency (RF) circuitry comprising:
an RF receiver configured to receive a transmit control command from a base station;
a transmit counter configured to:
receive, at a logical NOR gate, a compression mode interrupt signal and a transmit activation signal;
output, from the logical NOR gate, a reset signal;
receive a transmit counter clock signal;
increment a count of the transmit counter based on the transmit counter clock signal, the count of the transmit counter, and the transmit control command,
wherein response to the transmit control command containing an advance transmission instruction, the transmit counter is reset at least a clock cycle early,
wherein response to the transmit control command containing a delay transmission instruction the transmit counter is held in reset for at least a clock cycle, and
wherein a pulse is provided from a transmit counter output upon resetting; and
generate a transmit synchronization signal having a first period and based on outputted pulses from the transmit counter logically anded with a transmit activation signal, such that the first period is based on the count of the transmit counter; and
an RF transmitter configured to:
receive baseband transmit data;
slice the baseband transmit data into a plurality of data slices;
receive the transmit synchronization signal;
gate transmission of each of the data slices based upon the transmit synchronization signal; and
wherein the gated transmission of each of the data slices is synchronized with the base station.

3. The RF circuitry of claim 2 wherein the transmit counter is further configured to:
receive a transmit activation signal having an active state and an inactive state; and
disable the transmit synchronization signal during the inactive state of the transmit activation signal.

4. The RF circuitry of claim 2 wherein the transmit counter is further configured to:
receive a compressed mode interrupt signal having an interrupted state and a non-interrupted state; and
increment during the interrupted state.

5. The RF circuitry of claim 4 wherein the transmit counter is further configured to:
receive a transmit activation signal having an active state and an inactive state;
not increment during a combination of the inactive state of the transmit activation signal and the non-interrupted state of the compressed mode interrupt signal.

6. The RF circuitry of claim 4 wherein the transmit counter is further configured to:
receive a transmit activation signal having an active state and an inactive state;
reset during a combination of the inactive state of the transmit activation signal and the non-interrupted state of the compressed mode interrupt signal.

7. The RF circuitry of claim 2 wherein:
the transmit counter is further configured to:
receive a compressed mode interrupt signal having an interrupted state and a non-interrupted state; and
increment the count of the transmit counter during the interrupted state of the compressed mode interrupt signal;
the compressed mode interrupt signal is based on the at least one transmit control command; and
decoding circuitry configured to:
receive transmit control information;
provide baseband transmit data;
provide the transmit activation signal; and
provide the compressed mode interrupt signal.

8. The RF circuitry of claim 7 wherein the transmit counter is further configured to:
receive a transmit activation signal having an active state and an inactive state; and
hold the count of the transmit counter during a combination of the inactive state of the transmit activation signal and the non-interrupted state of the compressed mode interrupt signal.

9. The RF circuitry of claim 2 wherein the RF transmitter further comprises a data slice buffer configured to provide each of the plurality of data slices for transmission by an RF modulator based on the transmit synchronization signal.

10. The RF circuitry of claim 2 wherein:
the transmit counter clock signal has a plurality of clock cycles, such that each of the plurality of clock cycles has a duration of a second period;
transmit timing adjustment information has one of at least a first value and a second value;
the first period is approximately equal to a value of the second period times a first integer; and
when the transmit timing adjustment information has the first value, the first integer is equal to a nominal value.

11. The RF circuitry of claim 10 wherein when the transmit timing adjustment information has the second value, the first integer is equal to the nominal value minus a second integer.

12. The RF circuitry of claim 10 wherein when the transmit timing adjustment information has the second value, the first integer is equal to the nominal value plus a second integer.

13. The RF circuitry of claim 12 wherein the transmit timing adjustment information has one of the first value, the second value, and a third value, such that when the transmit timing adjustment information has the third value, the first integer is equal to the nominal value minus a third integer.

14. The RF circuitry of claim 13 wherein:
when the transmit timing adjustment information has the first value, the transmit counter is incremented for each of the plurality of clock cycles;
when the transmit timing adjustment information has the second value, the transmit counter is not incremented for each of the plurality of clock cycles; and
when the transmit timing adjustment information has the third value, the transmit counter is incremented twice for at least one of the plurality of clock cycles.

15. The RF circuitry of claim 14 wherein the second integer is equal to one and the third integer is equal to one.

16. The RF circuitry of claim 15 wherein:
the value of the second period is approximately equal to one divided by 31.2 megahertz;
the nominal value is equal to sixty-five; and
a nominal duration of the first period is equal to eight times a duration of a chip.

17. The RF circuitry of claim 16 wherein:
the transmit counter is further configured to:
receive a compressed mode interrupt signal having an interrupted state and a non-interrupted state;
receive a transmit activation signal having an active state and an inactive state;

increment during the interrupted state of the compressed mode interrupt signal; and not increment during a combination of the inactive state of the transmit activation signal and the non-interrupted state of the compressed mode interrupt signal;

a duration of a slot is equal to 2560 times the duration of the chip; and a duration of the non-interrupted state is equal to at least three times the duration of the slot.

18. The RF circuitry of claim 2 wherein the transmit counter is further configured to:

receive a transmit activation signal having an active state and an inactive state; and reset during the inactive state of the transmit activation signal.

19. The RF circuitry of claim 2 wherein the transmit counter is further configured to:

receive a transmit activation signal having an active state and an inactive state; and disable the transmit synchronization signal during the inactive state of the transmit activation signal.

20. The RF circuitry of claim 2 wherein the advance transmission instruction includes an advance count period, the transmit counter is reset early by the advance count period of two or more clock cycles.

21. The RF circuitry of claim 2 wherein the delay transmission instruction includes a delay count period, the transmit counter is held in reset for the delay count period of two or more clock cycles.

22. Radio frequency (RF) circuitry comprising:

an RF receiver configured to receive an RF input signal from a base station, and to output baseband receive information, wherein the RF input signal includes a transmit control command, and wherein the transmit control command includes at least one of a start command, an adjust command, an interrupt command, and a resume command;

a baseband controller configured to receive the baseband receive information from the RF receiver, and to output baseband transmit information, and wherein the baseband receive information includes the transmit control command;

decoding circuitry configured to receive the baseband transmit information, and to output: baseband transmit data, a transmit activation signal, a transmit adjustment signal, and a compressed mode interrupt signal;

transmit counter circuitry configured to receive: a transmit counter clock signal, the transmit activation signal from the decoding circuitry, the transmit adjustment signal from the decoding circuitry, and the compressed mode interrupt signal from the decoding circuitry, and to output a transmit synchronization signal; and a radio frequency (RF) transmitter configured to receive the transmit synchronization signal from the transmit counter circuitry, to receive the baseband transmit data from the decoding circuitry, and to output a radio frequency (RF) output signal;

a logical NOR gate configured to receive the compression mode interrupt signal and the transmit activation signal, and to output a reset signal;

a transmit counter configured to receive: the transmit counter clock signal, the transmit adjustment signal, and the reset signal, and to output a transmit counter output signal;

a logical AND gate configured to receive the transmit counter output signal and the transmit activation signal, and to output a transmit synchronization signal.

23. The RF circuitry of claim 22, wherein the transmit counter circuitry is configured to:

increment an internal count value from zero until a maximum value during a nominal count period while the transmit activation signal is enabled and the reset signal is not enabled;

drop the internal count value to zero when the maximum value is reached at the end of the nominal count period;

output the transmit counter output signal after dropping the internal count value to zero, wherein the transmit counter output signal is a transmit counter pulse;

output the transmit synchronization signal from the logical AND gate upon the logical AND gate receiving the transmit counter pulse and receiving an enabled transmit activation signal, wherein the transmit synchronization signal includes a transmit synchronization pulse, and wherein the transmit synchronization pulse is caused by and corresponds with the transmit counter pulse.

24. The RF circuitry of claim 23, wherein the transmit counter circuitry is configured to:

reduce a time period between transmit counter pulses by at least one clock cycle by dropping the internal count value to zero before the maximum count value is reached; and increase the time period between transmit counter pulses by at least one clock cycle by holding the internal count value at zero for at least one clock cycle after the internal count value has dropped to zero.

25. The RF circuitry of claim 24, wherein the transmit counter circuitry is configured to:

reduce the time period between transmit counter pulses by at least two clock cycles by dropping the internal count value to zero at least two counts before the maximum count value is reached; and increase the time period between transmit counter pulses by at least two clock cycle by holding the internal count value at zero for at least two clock cycles after the internal count value has dropped to zero.

* * * * *